United States Patent
Oduro

(10) Patent No.: US 11,326,439 B2
(45) Date of Patent: May 10, 2022

(54) COMPOSITIONS, SYSTEMS, AND METHODS FOR IRON SULFIDE SCALE IDENTIFICATION, PREVENTION, AND REDUCTION

(71) Applicant: Saudi Arabian Oil Company, Dhahran (SA)

(72) Inventor: Harry Daniel Oduro, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 16/875,613

(22) Filed: May 15, 2020

(65) Prior Publication Data

US 2021/0355809 A1    Nov. 18, 2021

(51) Int. Cl.
*C09K 8/54* (2006.01)
*E21B 47/00* (2012.01)
*C09K 8/32* (2006.01)
*C09K 8/532* (2006.01)

(52) U.S. Cl.
CPC .............. *E21B 47/006* (2020.05); *C09K 8/32* (2013.01); *C09K 8/532* (2013.01); *C09K 8/54* (2013.01); *C09K 2208/20* (2013.01); *C09K 2208/32* (2013.01)

(58) Field of Classification Search
CPC ........... E21B 47/006; C09K 8/32; C09K 8/54; C09K 8/532; C09K 2208/32; C09K 2208/20
See application file for complete search history.

(56) References Cited

U.S. PATENT DOCUMENTS

| | | |
|---|---|---|
| 3,855,099 A | 12/1974 | Matson |
| 4,220,550 A | 9/1980 | Coffey et al. |
| 4,276,185 A | 6/1981 | Martin |
| 4,289,639 A | 9/1981 | Buske |
| 4,381,950 A | 5/1983 | Lawson |
| 6,887,840 B2 | 5/2005 | Miller |
| 6,924,253 B2 | 8/2005 | Palmer et al. |
| 7,398,824 B1 | 7/2008 | Wang et al. |
| 7,955,482 B2 | 6/2011 | Nuzzio |
| 9,052,263 B2 | 6/2015 | Potyrailo et al. |
| 9,841,403 B2 | 12/2017 | Lee et al. |
| 10,253,244 B2 | 4/2019 | Holtsclaw et al. |
| 10,435,989 B2 * | 10/2019 | Peng ................. E21B 37/06 |
| 2003/0015437 A1 | 1/2003 | Luther et al. |
| 2003/0062316 A1 | 4/2003 | Mattox et al. |
| 2011/0152153 A1 | 6/2011 | Trahan |
| 2012/0067784 A1 * | 3/2012 | Gallup ................. C10G 21/16 |
| | | 208/251 R |
| 2018/0105732 A1 * | 4/2018 | Okocha .................. C02F 5/14 |
| 2019/0226335 A1 | 7/2019 | Lan et al. |
| 2019/0233711 A1 | 8/2019 | Oduro et al. |
| 2020/0063017 A1 * | 2/2020 | Todd ..................... C23F 11/04 |

FOREIGN PATENT DOCUMENTS

| | | | |
|---|---|---|---|
| CN | 1731166 | * | 2/2006 |
| CN | 102621205 B | | 5/2016 |
| WO | 2018052451 A1 | | 3/2018 |

OTHER PUBLICATIONS

Safety data sheet (of Zinc acetate) downloaded on Sep. 15, 2021.*
P. Brendel et al, Development of a gold amalgam voltammetric microelectrode for the determination of dissolved Fe, Mn, O2, and S (-II) in porewaters of Marine and freshwater sediments, Environ. Sci. Technol., 1995, 29, 751-561.*
David Rickard, "The solubility of FeS," Geochim et Cosmochim Acta, 2006, 70, pp. 5779-5789.
Hansen et al., "Evidence of Aqueous Iron Sulfide Clusters in the Vadose Zone," Vadose Zone JournaL, 2014, 13(3).
Jin et al., "Electrochemical detection of chemical pollutants based on gold nanomaterials," Trends in Environmental Analytical Chemistry, 14, 2017, pp. 28-36.
Luther, III, et al., "Use of voltammetric solid-state (micro)electrodes for studying biogeochemical processes: Laboratory measurements to real time measurements with an in situ electrochemical analyzer (ISEA)," Marine Chemistry, 108, 2008, pp. 221-235.
Matamoros-Veloza et al., "A highly reactive precursor in the iron sulfide system," Nature Communications, 2008, 9: 3125.

(Continued)

*Primary Examiner* — Kumar R Bhushan
(74) *Attorney, Agent, or Firm* — Bracewell LLP; Constance G. Rhebergen

(57) ABSTRACT

Compositions and methods for prevention and reduction of iron sulfide scale formation, one method including detecting at least one component indicative of an iron sulfide scale precursor, the at least one component selected from the group consisting of: $H_2S$; $HS^-$; $S^{2-}$; $S_n^{2-}$; $FeS_{(aq)}$; $Fe^{2+}$; $Fe^{3+}$, and combinations of the same; preparing a composition to react with the iron sulfide scale precursor, the composition comprising at least one compound selected from the group consisting of: a methylating agent; a metal operable to react with sulfide species; a compound to increase the oxidation state of $Fe^{2+}$; and combinations of the same; and applying the composition to the iron sulfide scale precursor to consume the iron sulfide scale precursor.

13 Claims, 5 Drawing Sheets

(56) References Cited

OTHER PUBLICATIONS

International Search Report and Written Opinion for PCT Application No. PCT/US2021/032186 dated Aug. 26, 2021.
Alexey Kamyshny Jr., et al., "Protocol for Quantitative Detection of Elemental Sulfur and Polysulfide Zero-Valent Sulfur Distribution in Natural Aquatic Samples", Geostandards and Geoanalytical Research, vol. 33, No. 3, 2009, pp. 415-435.
Paul J. Brendel, et al, "Development of a Gold Amalgam Voltammetric Microelectrode for the Determination of Dissolved Fe, Mn, O2, and S(-II) in Porewaters of Marine and Freshwater Sediments", Environmental Science & Technology, vol. 29, No. 3, 1995, pp. 751-761.

* cited by examiner

COMPOSITIONS, SYSTEMS, AND METHODS FOR IRON SULFIDE SCALE IDENTIFICATION, PREVENTION, AND REDUCTION

BACKGROUND

Field

The present disclosure relates generally to compositions, systems, and methods for identifying, preventing, and reducing iron sulfide scale formation. In particular, the disclosure relates to voltammetric identification of iron sulfide scale precursors and chemical compositions for preventing and reducing iron sulfide scale formation from said precursors.

Description of the Related Art

Downhole scale formation in oil and gas wells, such as for example sour gas wells, is a persistent problem that adversely affects operating costs and hydrocarbon production. Scales can include, and in some instances be predominantly, iron sulfides, of which iron disulfide ($FeS_2$) is oftentimes considered to be the most difficult to remove. Though mechanical descaling treatments can be implemented in wellbore and hydrocarbon production applications, these are time-consuming and will increase operating costs.

Iron sulfides, such as for example pyrrhotite, troilite, mackinawite, and greigite, can be dissolved with acids such as 15% by volume HCl; however, this may cause damage to production systems including corrosion to downhole metallurgy, and uncontrolled $H_2S$ gas release. The solubility of iron disulfide in acids is slow and difficult according to SPE 68315, Iron Sulfide Scale: Formation, Removal and Prevention, and using acids may not efficiently remove the scales.

Iron sulfide deposition in downhole applications has caused loss of gas production and loss of access to reservoir management and surveillance. Prior art scale removal compositions and methods can cause serious corrosion to steel tubing and other metal components in a wellbore or proximate a hydrocarbon-bearing reservoir.

There are inherent problems involved with controlling iron sulfide scale formation and deposition in ultra-sour oil and gas fields across the globe, which cost billions of US dollars per year to mitigate. Heightened costs of FeS scaling and deposition prevention can be attributed to little knowledge available regarding FeS formation mechanisms and reactions in sour and ultra-sour reservoirs. Reactions of reduced hydrogen sulfide and sulfur intermediate species (for example, from thermochemical sulfate reduction (TSR) and bacterial sulfate reduction (BSR)) with ferric/ferrous irons under reduction-oxidation (redox) environments are difficult to control, in part because of fast oxidation kinetics, and exotic thermodynamic stability in high pressure and high temperature (HPHT) conditions.

One way to overcome scale formation and accumulation is by direct in situ measurements related to the onset of FeS scale deposition during hydrocarbon production. Certain techniques must be element and species specific (for example, for iron and sulfur), environmentally sensitive, and able to detect and decipher scale precursor iron sulfide molecular cluster ($FeS_{(aq)}$) formation in HPHT conditions. By detecting iron sulfide scale precursors and likely formation, appropriate inhibition and mitigation strategies can be developed.

Iron sulfide molecular clusters, also referred to herein as $FeS_{(aq)}$, are a group of polynuclear nano-particulate iron sulfide complexes formed under reducing conditions at different anoxic or suboxic interfaces in petroleum transmission pipelines and downhole reservoirs. $FeS_{(aq)}$ are necessary precursors for the formation of solid iron sulfide minerals and scale, and dissolution of $FeS_{(aq)}$ molecular clusters from bulk FeS minerals like mackinawite (tetrahedral FeS), pyrrhotite (octahedral $Fe_{1-x}S$), and greigite (isometric octahedral $Fe_3S_4$) has been proven as a precursor for FeS scale mineralization in typified sour petroleum reservoirs.

Formation, deposition, and treatment of iron sulfide (FeS) scaling mineralization and contaminants build-up is poorly understood, and this impacts (i) the quality and quantity of natural gas (NG) produced per day from a reservoir, such as a sour reservoir; (ii) reservoir permeability downhole, as well as plugging pressure control devices; and (iii) eventual shutdown of oil or gas plants. Despite FeS occurrence being widespread in many hydrocarbon industries, iron sulfide molecular clusters $FeS_{(aq)}$ and final mineralized FeS scaling products (sometimes termed black powder) are not well understood in terms of formation processes and management, causing issues with metal corrosion and flow.

FeS scale paragenesis in hydrocarbon exploration and production operations in sulfur-bearing reservoirs is generally presumed to proceed from iron sulfide molecular clusters over ferromagnetic pyrrhotite ($Fe_{1-x}S$) as illustrated in Equations 1 and 2. Multiple potential reaction pathways for FeS formation in petroleum reservoirs are believed to exist. These include (1) direct precipitation from the reaction of iron and sulfide to form iron monosulfide precursors (for example, mackinawite); (2) progressive conversion of solid iron monosulfide species to form iron deficient pyrrhotite; and (3) further redox reactions of iron monosulfide that involve reactive sulfide intermediate species (for example, bisulfide ($HS^-$) and polysulfide $S_n^{2-}$) that lead to the formation of stable marcasite and pyrite minerals as shown in Equations 1 and 2.

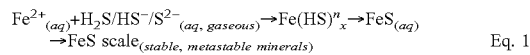

Eq. 1

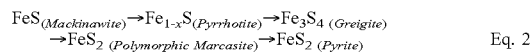

Eq. 2

Formation, deposition, and treatment of solid iron sulfide scaling products that inhibit or block hydrocarbon migration pathways are poorly understood, and this ultimately reduces production and causes severe corrosion and equipment damage to both upstream and downstream facilities.

There have been certain pilot plant scale FeS treatment studies conducted to mitigate iron sulfide deposition issues; however, very few technologies have been deployed in the field to detect FeS in situ. In oil and gas field settings, FeS detection and mitigation technologies are generally hampered by the fast reactivity of iron and sulfide species, the low sensitivity of sensors, and the dynamic range of FeS concentrations and precursors at HPHT reservoir conditions.

Current control and mitigation practices for FeS scale in the oil industry have focused on treating or removing scale via a multi-stage process using organic and inorganic solutions. However, with continuous or direct addition of acidic solution: (i) acid only removes metastable phases of iron sulfide scale; (ii) acid can produce high $H_2S$ concentrations from the reservoir that usually exacerbate pipeline corrosion; and (iii) acid can stimulate microbial growth through microbial sulfur oxidation and reduction pathways. Improved detection and inhibition formulations and methods are needed to provide preventive approaches to mitigate FeS deposition, and to generate little to no $H_2S$, leading to lower operational costs associated with corrosion and microbial treatment in oil and gas production.

SUMMARY

Applicant has recognized a need for systems, processes, and compositions for the accurate detection of and environmentally-friendly prevention and removal of $FeS_{(aq)}$ molecular clusters and solid FeS scale in hydrocarbon production and processing operations.

Disclosed here are sensitive electrochemical systems and methods for detecting iron sulfide scale precursors that eventually aggregate to form iron sulfide scale deposition contaminants in sour oil and gas fields. Additionally, embodiments disclosed here present novel chemical formulations, along with methods for producing the same, that can be used throughout the petroleum industry, or others, to inhibit nano-particulate iron sulfide precursors ($FeS_{(aq)}$) prior to or during the onset of stable FeS scale mineralization and deposition in oil and gas field production operations. While certain prior art electrodes are strictly designed to detect trace element species for biogeochemical processes from microbial mats, cultures, and waters emanating from hydrothermal systems, voltammetry electrodes described here are able to detect iron, sulfide, and iron sulfide indicative species, including precursor species, in mixed petroleum, hydrocarbon, and aqueous HPHT systems and environments.

A reservoir can be considered "sour" when the $H_2S$ content in produced reservoir oil and gas ranges from about 3-25 wt. %, and $H_2S$ content can run as high as 90 wt. % in gas fields classified as "ultra-sour" reservoirs.

The costs and negative impacts of FeS scale deposits, generically termed as Black Powder (BP) in the hydrocarbon industry, can be attributed, in part, to the scant knowledge available on iron sulfide formation in low to high concentration sulfur-bearing reservoirs. Disclosed here are systems and methods for detection of scale precursors called nano-particulate $FeS_{(aq)}$ molecular clusters, which were detected by real-time in situ electrochemical methods applicable for oil and gas fields.

Understanding the geochemical formation mechanisms and timing of $FeS_{(aq)}$ molecular clusters will enable the oil and gas industries to inhibit or control the onset of FeS scaling and deposition in HPHT conditions.

Modified high temperature in situ solid state glass gold-amalgam electrochemical sensors are disclosed, and embodiments allow monitoring and quantifying of minimum amounts and forms of iron and sulfide species required to initiate iron sulfide molecular clusters, $FeS_{(aq)}$, and subsequent buildup of FeS scale deposition under hydrocarbon production conditions.

Additionally disclosed are new solvent formulations that can be assimilated into oilfield operations to inhibit iron sulfide molecular clusters, which nucleate to form FeS scaling products in oil and gas fields. Rapid detection systems and new chemical formulations are therefore provided to inhibit and curb FeS precursors to ensure smooth operations and uninterrupted flow of oil and gas, in either production or processing where iron sulfide scale is likely to form.

As noted, little is known about the role of $FeS_{(aq)}$ molecular cluster formation as part of the reactions governing the pathways of FeS scale mineralization in petroleum reservoirs. Without being bound by any theory or practice, dynamic conditions between the formation of the clusters, as well as other thermodynamic species illustrated in the reaction pathways, serve as critical components for inhibiting FeS scaling and deposition in upstream and downstream hydrocarbon production and processing systems.

Detection systems and methods along with chemical formulations disclosed here allow effective inhibition and control of the onset of stable/metastable FeS scale deposits in hydrocarbon transmission pipelines and downhole environments at HPHT reservoir conditions. Suitable HPHT temperature and pressure ranges for in situ detection and treatment systems include between about 75° F. to about 315° F. and about 1,000 psi to about 2,300 psi, respectively.

Disclosed geochemical surveillance and monitoring of the following FeS scale precursors is enabled using real-time electrochemical detection systems and methods during hydrocarbon exploration, production, and processing operations, for example in sulfur-bearing carbonate reservoirs: $Fe^{2+}$ ions; molecular $FeS_{(aq)}$ clusters; hydrogen sulfide ($H_2S$); and reactive sulfide intermediate species ($HS^-/S^{2-}/S_n^-$).

Once molecular $FeS_{(aq)}$ clusters are detected in a production or flow line system or process, a mixed solvent comprising any one of or any combination of methyl trifluoromethanesulfonate ($CF_3SO_3CH_3$) (methyl triflate), zinc acetate ($Zn(CH_3CO_2)_2$), and copper chloride ($CuCl_2$) can be applied to prevent, reduce, or remove FeS scale mineralization.

Modified HPHT glass Au-amalgam electrodes were used to detect and quantify electroactive species of FeS scale precursors via cyclic voltammetry in petroleum producing environments. Inhibition of nano-particulate $FeS_{(aq)}$ molecular clusters in oil and gas fields can be achieved. Nano-particulate $FeS_{(aq)}$ molecular clusters are inhibited by newly-formulated mixed organic-ionic solvent systems. Core flood experiments using sulfur-bearing petroleum source rocks were performed for the first time to observe the formation and build-up of nano-particulate $FeS_{(aq)}$ molecular clusters in petroleum systems. In addition, embodiments have been designed to investigate, detect, and monitor solution-phase electroactive species such as $FeS_{(aq)}$, $Fe^{3+}$, $Fe^{3+}$ $S^{2-}$, $O_2$, $H_2S$, including sulfide intermediates such as $HS^-$, $S^{2-}$, and $S_n^{2-}$, which are responsible for forming iron sulfide, FeS, solid scales in petroleum production and processing systems.

In other words, modified HPHT glass Au-amalgam electrodes for direct in situ electrochemical detection methods directly monitor solution-phase and nano-particulate $FeS_{(aq)}$ molecular clusters at reservoir conditions. Rapid geochemical surveillance and monitoring of FeS scale and deposit precursors in oil and gas fields is enabled. In some embodiments, an 80%, 90%, or 95% inhibition of nano-particulate $FeS_{(aq)}$ molecular clusters is observed prior to the onset of formation of stable FeS scaling and deposition in petroleum systems. Complete scavenging of sulfides and up to 70% or 81% reduction in certain reactive species under reservoir HPHT conditions are achieved.

Therefore, disclosed here are methods for iron sulfide scale precursor detection, reduction, and removal, one method including the steps of detecting at least one component indicative of an iron sulfide scale precursor, the at least one component selected from the group consisting of: $H_2S$; $HS^-$; $S^{2-}$; $FeS_{(aq)}$; $Fe^{2+}$; $Fe^{3+}$; and combinations of the same; preparing a composition to react with the iron sulfide scale precursor, the composition comprising at least one compound selected from the group consisting of: a methylating agent; a metal operable to react with sulfide species; a compound to increase the oxidation state of $Fe^{2+}$; and combinations of the same; and applying the composition to the iron sulfide scale precursor to consume the iron sulfide scale precursor. In some embodiments, the step of detecting comprises the use of a solid state glass Au-amalgam electrode comprising activated carbon particles. In other embodiments, the Au-amalgam electrode comprises a gold wire about 100 µm in diameter. In certain embodiments, the method includes the use of a Pt counter electrode, and a Ag/AgCl reference electrode with the Au-amalgam electrode.

Still in other embodiments of the method, the composition comprises the methylating agent, the metal operable to react with sulfide species; and the compound to increase the oxidation state of $Fe^{2+}$. In some embodiments the methylating agent comprises methyl trifluoromethanesulfonate, the metal comprises zinc, and the compound to increase the oxidation state of $Fe^{2+}$ comprises chlorine. In yet other embodiments, the step of preparing comprises mixing methyl trifluoromethanesulfonate with copper chloride and zinc acetate. In some embodiments, the molar ratio of methyl trifluoromethanesulfonate to zinc acetate is about 1:1 and the molar ratio of methyl trifluoromethanesulfonate to copper chloride is about 10:1. In some other embodiments, the step of mixing includes the use of an organic solvent. In certain embodiments, the organic solvent comprises ethanol.

In some embodiments of the method, before the step of applying the composition is cooled to below room temperature. Still in other embodiments, the method includes the step of applying voltammetry to verify a decrease of concentration in at least one component selected from the group consisting of: $H_2S$; $HS^-$, $S^{2-}$; $FeS_{(aq)}$; $Fe^{2+}$; and combinations of the same, or to verify an increase in concentration of $Fe^{3+}$. In other embodiments, the method includes the step of applying the composition to reduce the formation of a compound selected from the group consisting of: PbS, ZnS, HgS, and combinations of the same. Still in other embodiments, the step of applying the composition to the iron sulfide scale precursor to consume the iron sulfide scale precursor comprises applying the composition in a batch of about 3 barrels to about 5 barrels to a wellbore proximate a hydrocarbon-bearing formation every about 30 to about 45 days.

Additionally disclosed are compositions for prevention and reduction of iron sulfide scale formation, one composition including a methylating agent; a metal operable to react with sulfide species; and a compound to increase the oxidation state of $Fe^{2+}$, where at least one of the methylating agent, the metal, and the compound to increase the oxidation state of $Fe^{2+}$ react with at least one component selected from the group consisting of: $H_2S$; $HS^-$, $S^{2-}$; $S_n^{2-}$; $FeS_{(aq)}$; $Fe^{2+}$; and combinations of the same. In some embodiments, the methylating agent comprises methyl trifluoromethanesulfonate, the metal comprises zinc, and the compound to increase the oxidation state of $Fe^{2+}$ comprises chlorine. Still in other embodiments, the composition comprises methyl trifluoromethanesulfonate, copper chloride, and zinc acetate. In certain embodiments, the molar ratio of methyl trifluoromethanesulfonate to zinc acetate is about 1:1 and the molar ratio of methyl trifluoromethanesulfonate to copper chloride is about 10:1. In yet other embodiments, the composition further comprises an organic solvent. In certain embodiments, the organic solvent comprises ethanol.

Still in other embodiments of the composition, the composition consists essentially of methyl trifluoromethanesulfonate, copper chloride, and zinc acetate. In other embodiments, the composition consists of methyl trifluoromethanesulfonate, copper chloride, and zinc acetate.

Additionally disclosed are methods for producing a solid state glass gold-amalgam electrode, one method including disposing a wire comprising gold in and through a high-temperature glass electrode body to expose a portion of the wire external to the high-temperature glass electrode body for detecting electrical current, the exposed portion of the wire located proximate mercury; and encasing a portion of the wire proximate the exposed portion with an epoxy resin containing gold and carbon particles. In some embodiments, the high-temperature glass electrode body comprises borosilicate glass. Still in other embodiments, the method includes the step of detecting at least one component indicative of an iron sulfide scale precursor, the at least one component selected from the group consisting of: $H_2S$; $HS^-$; $S^{2-}$; $FeS_{(aq)}$; $Fe^{2+}$; $Fe^{3+}$; and combinations of the same. Other embodiments of the method include the steps of preparing a composition to react with the iron sulfide scale precursor, the composition comprising at least one compound selected from the group consisting of: a methylating agent; a metal operable to react with sulfide species; a compound to increase the oxidation state of $Fe^{2+}$; and combinations of the same; and applying the composition to the iron sulfide scale precursor to consume the iron sulfide scale precursor.

Still other embodiments further include pulverizing activated carbon; combining the pulverized activated carbon with gold; and combining the pulverized activated carbon and gold with ultra-high temperature epoxy resin stable up to about 600° F. to form the epoxy resin containing gold and carbon particles. Other embodiments include acidifying the pulverized activated carbon; combining the pulverized activated carbon with a stabilizing functionalized amine; and sonicating the pulverized activated carbon and gold with ultra-high temperature epoxy resin stable up to about 600° F., wherein the step of combining the pulverized activated carbon with gold comprises the use of chloroauric acid. In some embodiments, the pulverized activated carbon comprises particles with a median particle size between about 5 µm to about 10 µm and the gold comprises particles with a median particle size between about 2 nm to about 8 nm.

Additionally disclosed are solid state glass gold-amalgam electrodes, one electrode including a high-temperature glass electrode body comprising borosilicate glass; a wire comprising gold disposed in and through the high-temperature glass electrode body exposing a portion of the wire external to the high-temperature glass electrode body for detecting electrical current, the exposed portion of the wire located proximate mercury; and an epoxy resin containing gold and carbon particles encasing a portion of the wire proximate the exposed portion. In some embodiments, the wire comprising gold is about 100 µm in diameter. In other embodiments, the epoxy resin once dried is stable up to about 300° F., 400° F., 500° F., or 600° F. Still in other embodiments, a portion of the wire not encased by the epoxy resin containing gold and carbon particles is encased by epoxy resin without gold and carbon particulates. And still in other embodiments, the carbon particles exhibit a median particle size between about 5 µm to about 10 µm and the gold particles exhibit a median particle size between about 2 nm to about 8 nm.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
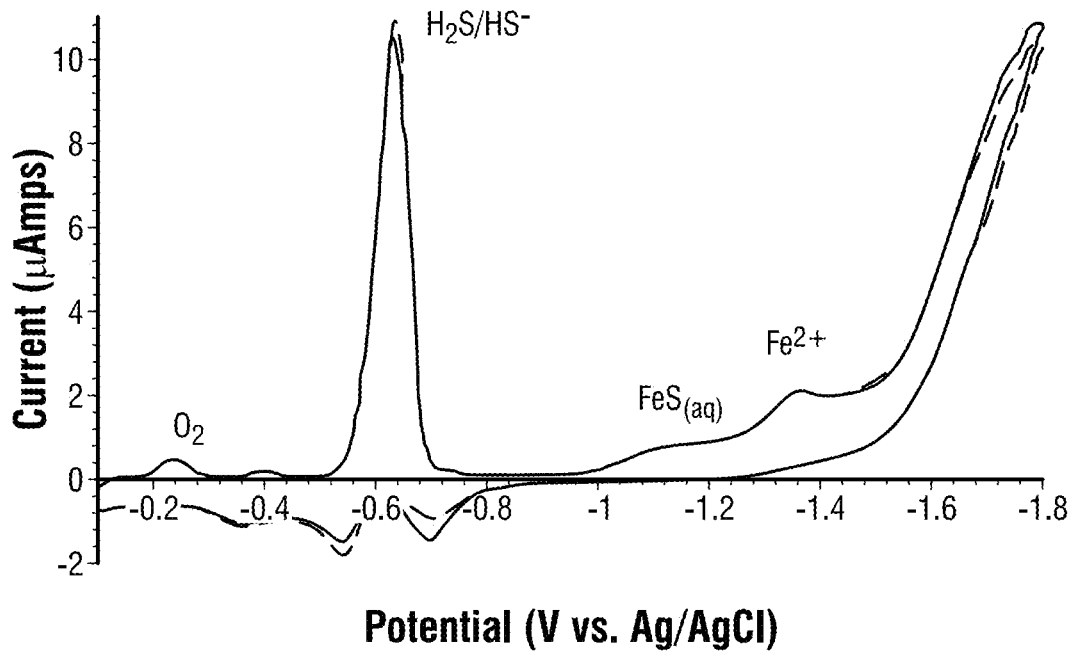
FIG. 1 shows a voltammogram of electroactive species detected by modified HPHT solid state glass Au-amalgam electrodes of the present disclosure under simulated petroleum reservoir conditions.

So that the manner in which the features and advantages of the embodiments of systems, processes, and compositions for the accurate detection of and environmentally-friendly prevention and removal of $FeS_{(aq)}$ molecular clusters and solid FeS scale in hydrocarbon production and processing operations, as well as others, which will become apparent, may be understood in more detail, a more particular description of the embodiments of the present disclosure briefly summarized previously may be had by reference to the embodiments thereof, which form a part of this specification. It is to be noted, however, that the experiments and drawings illustrate only various embodiments of the disclosure and are therefore not to be considered limiting of the present disclosure's scope, as it may include other effective embodiments as well.

Experimental & Analytical Methods

Glassware and plasticware materials used in the experiments were acid washed with 10% (V/V) $HNO_3$ and triple rinsed with sterilized 18 MΩ water before use. Solutions for iron sulfide molecular cluster preparation, $FeS_{(aq)}$ preparation, for FeS scale mineralization tests were prepared from 18 MΩ, UV-sterilized water purged for at least 30 minutes with ultra-high-purity (UHP), $O_2$-free $N_2$, in order to remove traces of oxygen. Stock solutions of $FeCl_2$, $Na_2S.9H_2O$, and $Fe(NH_4)_2.6H_2O$ (Mohr's salt) were made from their analytical, reagent-grade salts. 0.01 M PIPES (Piperazine-1,4-bis(2-ethanesulfonic acid)) from Sigma Aldrich (St. Louis, Mo.) was buffered with 0.01 M sodium chloride solution and used as a formation and condensed water medium. Research grade ethanol, methyl triflate (methyl trifluoromethanesulfonate ($CF_3SO_3CH_3$)), zinc acetate ($Zn(CH_3CO_2)_2$), and copper chloride ($CuCl_2$) were obtained from Acros chemicals (Geel, Belgium). Molecular $FeS_{(aq)}$ clusters were prepared under anoxic conditions by direct addition of 50-100 μM $Fe^{2+}$ prepared from standard Mohr's salt to 10-50 μM solutions of $H_2S/HS^-$ prepared from standard $Na_2S.9H_2O$.

HPHT Detection of Iron Sulfide Precursors. Analytical protocols for detecting iron sulfide molecular clusters, $FeS_{(aq)}$, under HPHT hydrocarbon reservoir conditions are needed. Prior art detection limits are greater than the concentrations at which the aqueous $FeS_{(aq)}$ molecular clusters generally exist; that is at greater prior-art-detectable concentrations, $FeS_{(aq)}$ visibly coalesces into nano-crystalline $FeS_{(mackinawite)}$.

As a result, new and modified HPHT solid state glass Au-amalgam electrodes (for example, 100 μm in diameter) plated with sensitive carbon were developed as an electrochemical detection system for in situ analysis of $FeS_{(aq)}$, $Fe^{2+}$, $Fe^{3+}$, $S^{2-}/S_n^{2-}$, $O_2$ and other dissolved species. The HPHT solid state glass Au-amalgam electrodes were used with a Pt counter electrode, and a Ag/AgCl reference electrode, operated with Analytical Instrument Systems, Inc. (AIS) software.

Figure 7:
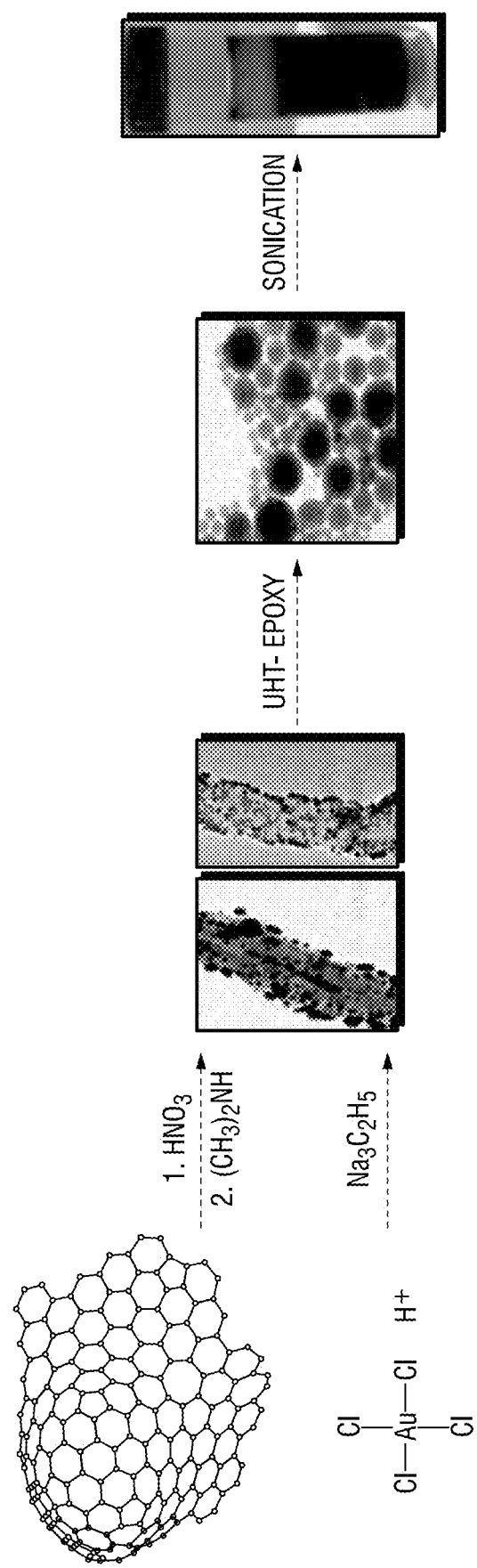
FIG. 7 is a schematic representation of the experimental procedure for the preparation of gold-coated, pulverized carbon particles mixed with ultra-high temperature epoxy resin for the manufacturing of the disclosed modified HPHT solid state glass Au-amalgam electrodes of the present disclosure.
Figure 8:
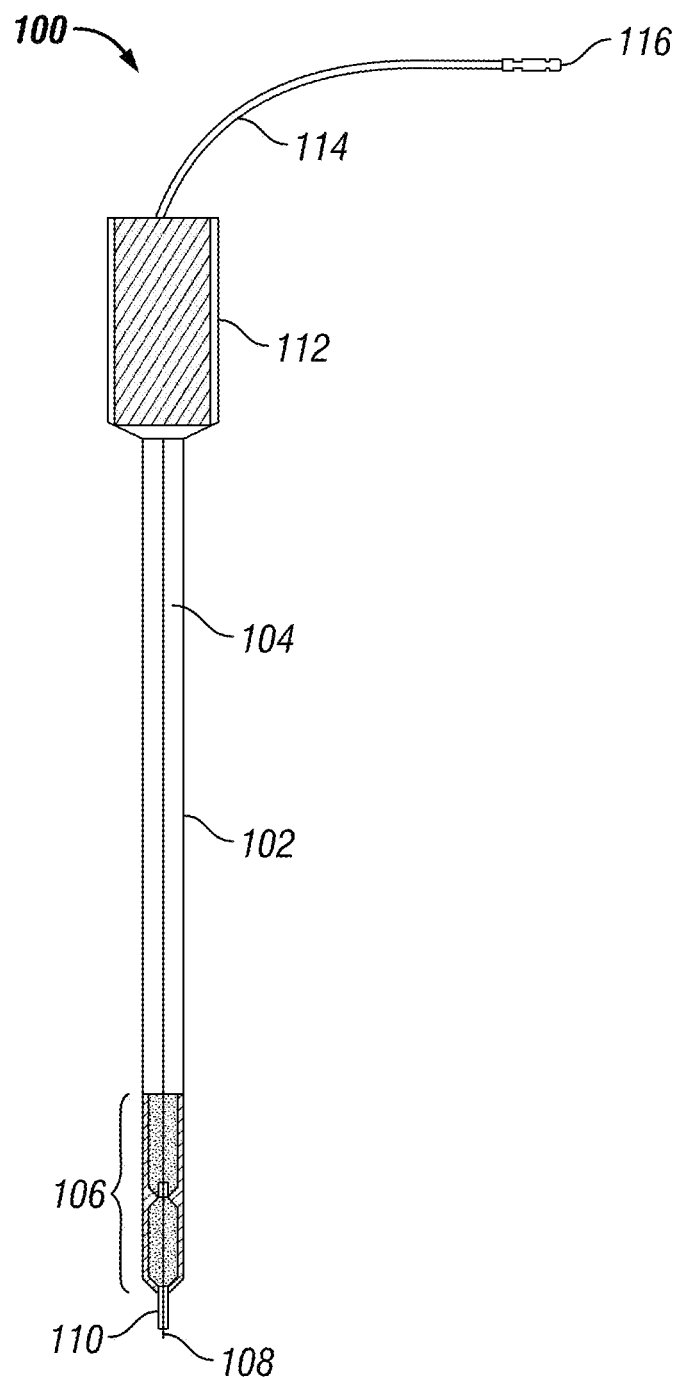
FIG. 8 shows a schematic design for the modified HPHT solid state glass Au-amalgam electrodes of the present disclosure.

FIG. 7 is a schematic representation of the experimental procedure for the preparation of gold-coated carbon particles mixed with ultra-high temperature epoxy resin for the manufacturing of the disclosed modified HPHT solid state glass Au-amalgam electrodes. FIG. 8 shows a schematic design for the modified HPHT solid state glass Au-amalgam electrodes of the present disclosure.

A modified HPHT solid state glass Au-amalgam electrode was prepared using pulverized activated carbon stabilized with gold nanoparticles. A stabilizing functionalized amine, dimethylamine, was used as shown in FIG. 7, along with nitric acid to treat the pulverized activated carbon. The pulverized activated carbon, represented as a lattice at left in FIG. 7, was acidified with hot nitric acid solution at 75° C. for 30 mins. The oxidized carbon particles were then rinsed three times with deionized water and dried in oven at 45° C. overnight. After drying, the activated carbon was allowed to undergo a reductive amination reaction with anhydrous dimethylamine at room temperature for 1 hour. Excess amine solution was washed twice with ethyl alcohol leaving the functionalized activated carbon, which was allowed to dry again at 45° C. overnight.

Median particle size for activated carbon was between about 5 μm to about 10 μm, and that of gold nanoparticles ranged from about 2 nm to about 8 nm, with an average of about 6 nm. Without being bound by any theory or practice, it is believed that the gold and carbon particles are at least partially covalently bonded or linked together to yield nanocomposite products during synthesis and manufacturing as a final product.

To deposit gold nanoparticles onto the functionalized activated carbon, 100 mL of 0.25 mM HAuCl4 (chloroauric acid) aqueous solution was mixed with a heated solution of 1.25 mM sodium citrate, and this mixture was allowed to reflux for 20 minutes with stirring to yield a wine-red colored solution. After heating for 30 min, the functionalized activated carbon was slowly added to the wine-red solution to produce an electroactive gold supported carbon nanocomposite colloidal solution, which was cooled to room temperature and stored in the dark. The obtained gold nanoparticles, electrostatically attracted by the carbon surfaces, and carbon were later mixed with ultra-high temperature epoxy resin (Duralco™ 4460 by Cotronics Corp. of Brooklyn, N.Y., stable up to about 600° F.), which exhibits excellent adhesion to glass, high bond strength, and high electrical resistance (volume resistivity of $10^{14}$ ohm·cm). Other similar epoxy resins can be used with high temperature resistance and high electrical resistance.

The final mixture was sonicated for 3 hours with heating at 65° C. to obtain a homogenous gelatinous solution, which was employed in manufacturing of highly sensitive solid state glass gold-amalgam electrodes. In FIG. 7, carbon and chloroauric acid are shown at left followed by the mixture of activated, functionalized carbon and gold nanoparticles, then the mixture added to ultra-high temperature (UHT) epoxy, and a final product at right for use with a glass electrode after sonication.

The glass gold-amalgam electrodes with plated carbon, represented in FIG. 8, were made by placing a 100 μm-diameter Au wire in and through a 0.5 mm diameter tipped borosilicate glass tubing. One end of the wire was exposed external to the glass tubing, while the other end of the gold wire was soldered onto a 0.75 mm high-temperature, epoxy-coated flexible coaxial cable. The Au wire was fixed within the borosilicate glass tubing by injecting a freshly prepared ultra-high temperature epoxy resin mixed with electroactive gold plated on carbon particle surfaces (from FIG. 7). After final solidification and drying of the epoxy overnight, the 0.5 mm diameter tip borosilicate glass tubing was polished with fine sand paper, followed by subsequent amalgamation with a mercury solution before use in in situ style electrochemical analyses. The proposed glass gold-amalgam electrodes plated with nanocomposite carbon exhibit ideal electrochemical behavior for in situ detection of iron, sulfide, and iron sulfide precursor clusters with a wide linear dynamic range, low detection limit, and excellent selectivity and reproducibility under HPHT reservoir conditions.

In general, deposition of mercury on carbon-coated gold surfaces (as a solid amalgam electrode) described here and according to Equation 3, is convenient for electrodic surfaces because they are nontoxic, easily prepared, and mechanically stable and thus compatible with measurement in combination with flowing systems at HPHT conditions. They also show long durability and allow for rapid surface pretreatment and simple electrochemical regeneration. In addition, the proposed glass gold-amalgam electrodes plated with nanocomposite carbon and mercury exhibit a homogeneous surface, large surface-to-volume ratios, and an advantageously wide linear range with $Hg^{2+}$. They also exhibit a high overpotential to the hydrogen evolution reaction. Additionally, the electrodes minimize any environmental contamination compared to traditional hanging mercury drop electrodes (HMDE's), because the surface layer of the amalgam is very thin.

$$Hg^{2+} + Au + 2e^- \rightarrow Hg(Au) \qquad \text{Eq. 3}$$

In FIG. 8, modified HPHT solid state glass Au-amalgam electrode 100 includes high temperature borosilicate glass body 102, shielded high temperature epoxy resin filling 104 disposed above the region containing gold nanoparticles plated on activated carbon mixed with epoxy resin 106. The detecting end of gold sensing wire 108 is disposed proximate mercury amalgam 110, and modified HPHT solid state glass Au-amalgam electrode 100 further includes electrode head 112, coaxial cable 114, and Bayonet Neill-Concelman (BNC) connector for an electrochemical analyzer 116. The durable electrodes can be used in organic, aqueous, and/or solid phases at HPHT conditions without risking damage, for example in cyclic voltammetry.

To test performance of the HPHT solid state glass Au-amalgam electrodes in petroleum applications and to investigate $FeS_{(aq)}$ molecular cluster formation, batch experiments were conducted in a HPHT glass reactor equipped with a magnetic stir bar, a thermocouple probe, a glass stopper, and a nitrogen bubbler. The batch experiments were initiated by direct addition of standard $Fe^{2+}$ and $Na_2S$ to solutions at micromolar (μM) concentrations to form $FeS_{(aq)}$ clusters, specifically in 0.01 M PIPES/0.01 M NaCl buffer solutions. The tests were carried out in an anaerobic chamber that was constantly flashed with UHP nitrogen gas. HPHT glass reactor temperature and pressure ranges for experiments described herein ranged from about 32° F. to about 212° F. and about 0 to about 10 psi, respectively.

Figure 2:
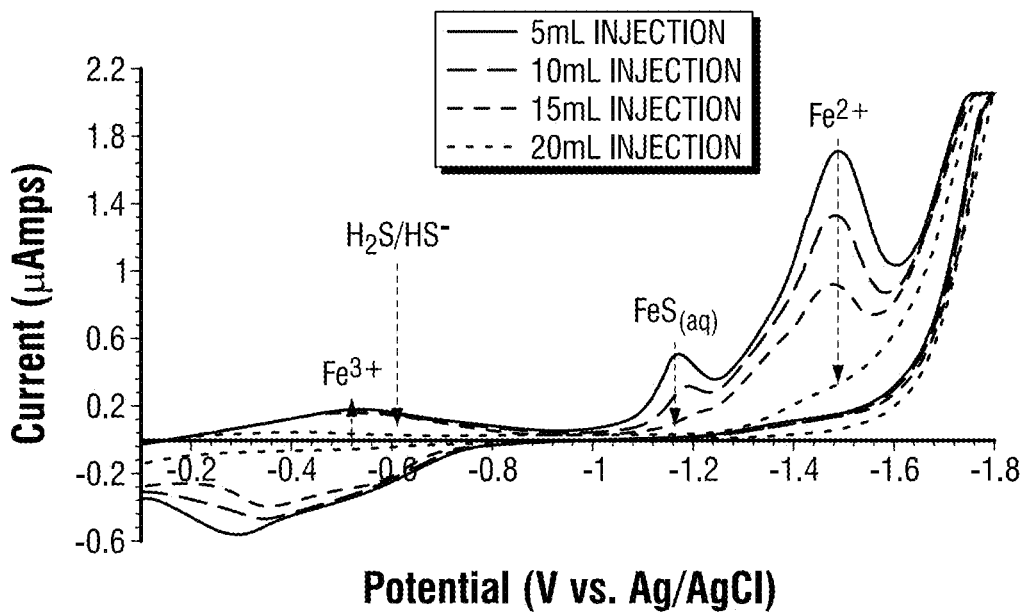
FIG. 2 shows real-time voltammetric scans in a glass reactor for experiments monitoring the formation and subsequent inhibition of molecular $FeS_{(aq)}$ clusters, iron(II), and sulfides after injecting a newly-formulated organic-ionic solvent inhibition mixture under simulated HPHT reservoir conditions.

Once nano-particulate iron sulfide molecular clusters were formed, generally within 30 seconds, the tip (see FIG. 8 units 108, 110) of the HPHT glass Au-amalgam electrode was carefully inserted into the glass reactor, which was continuously flashed with an inert gas $N_2$-bubbler. Cyclic voltammetry scans were performed from −0.05 V to −1.8 V and back to −0.05 V using Ag/AgCl as a reference electrode and Pt wire as a counter electrode. The potentials of the electroactive species were monitored to yield the following as shown in FIG. 1: trace amounts of oxygen ($O_2$) at −0.25 V; −0.6 V for $H_2S/HS^-$; −1.2 V for molecular clusters, $FeS_{(aq)}$ cluster complexes; and about −1.4 to −1.5 V for $Fe^{2+}$ as illustrated in FIGS. 1 and 2. All electrochemical measurements shown in FIG. 1 were taken using a computer-controlled Analytical Instrument Systems, Inc. (AIS) DLK-100 Potentiostat and a Princeton Applied Research Model 301 hanging drop mercury electrode (HDME).

Chemical Formulation And Synthesis Of Inhibition Solvent. In sour petroleum reservoirs, reactive sulfur and its intermediate species are responsible for FeS mineralization and scale deposition, reactive species including hydrogen sulfide ($H_2S$), bisulfide (HS), and polysulfides ($S^{2-}/S_n^{2-}$) as illustrated in Equation 1. Methyl triflate (methyl trifluoromethanesulfonate ($CF_3SO_3CH_3$)), zinc acetate (Zn $(CH_3CO_2)_2$), and copper chloride ($CuCl_2$) can protect and preserve groups in organic and inorganic synthesis processes due, in part, to their stability and fast chemical reactivity they impart on the sulfides species to which they attach. Other methylating agents, metals, and components operable to react with iron species can additionally or alternatively be used.

A unique chemical formulation based on the aforementioned chemistries was developed by using a three-necked, 250-mL, round-bottomed flask equipped with a nitrogen bubbler inlet, a Dean-Stark trap with reflux condenser, thermocouple probe, rubber septum, and an overhead mechanical stirrer that was charged with methyl trifluoromethanesulfonate (13.40 mL, 120.1 mmol, 2.10 equiv.) and ethanol solution (60 mL). The resulting solution was cooled to 0° C. in an ice bath followed by dropwise addition of a light blue homogeneous mixture of zinc acetate (20 g, 0.109 mol, 1.0 equiv.) and copper chloride (1.2 g, 0.009 mol, 0.1 equiv.) dissolved in 15 mL of ethanol. The reaction with methyl triflate was exothermic during dropwise addition. The ice bath was removed and the viscous solution was allowed to warm to ambient temperature. After 1 hour, a clear homogeneous mixture was formed, which optionally can be stored in a refrigerator for about 24 to about 78 hours, or directly used in iron sulfide molecular cluster inhibition or sulfide inhibition methods.

Equivalent molar ranges for suitable embodiments include a ratio of methyl trifluoromethanesulfonate:zinc acetate:copper chloride from about 0.12:0.1:0.01 to 2.3:2.0:0.5.

Iron Sulfide And Sulfides Inhibition Experiments. As previously discussed with respect to HPHT detection of iron sulfide precursors, after the formation of nano-particulate iron sulfide molecular clusters in a glass reactor, the composition comprising methyl triflate, zinc acetate, and copper chloride (having been stored in a refrigerator) was used to conduct inhibition tests by injecting the clear homogeneous mixture with an airtight syringe into the glass reactor. Within about 5 to 10 minutes, the inhibition of sulfide species was observed to adversely affect the yields of iron sulfide molecular cluster formation, as well as the iron concentration in the systems. As shown in the voltammogram of FIG. 2, the injection of the scale inhibition solvent formulation removed the sulfide species ($HS^-/H_2S$), inhibited $FeS_{(aq)}$ formation from 0.6 µAmps to 0.05 µAmps, and reduced the $Fe^{2+}$ concentrations from 1.8 µAmps to 0.95 µAmps while slightly increasing $Fe^{2+}$ concentration. The initial concentration used for iron sulfide tests ranged from 100-125 µM for $Fe^{2+}$ solution and 70-100 µM for $H_2S/HS^-$ solution.

Figure 3:
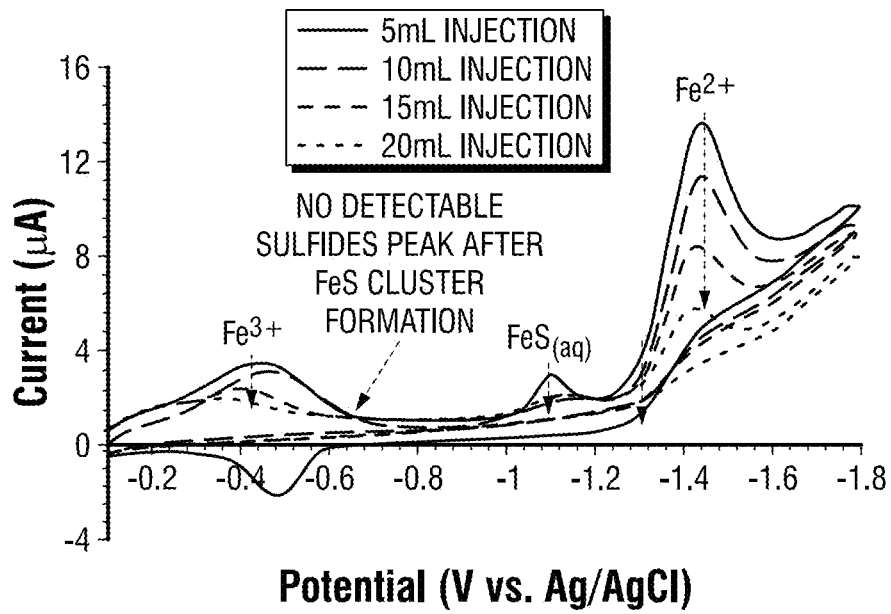
FIG. 3 shows real-time in situ voltammetric scans monitoring the formation and subsequent inhibition of molecular $FeS_{(aq)}$ clusters and iron(II) in coreflood experiments, described further herein, after injecting organic-ionic solvent inhibition mixtures.

In FIGS. 2 and 3, the 5 mL, 10 mL, 15 mL, and 20 mL "injections" specifically refer to the injection or addition of inhibition solvent mixtures comprising $CF_3SO_3CH_3$, $Zn(CH_3CO_2)_2$, and $ZnCl_2$ during the simulated glass reactor and coreflood experiments to further prevent FeS and precursor formation. The dotted arrows in FIGS. 2 and 3 show a decreasing trend in both $FeS_{(aq)}$ and $Fe^{2+}$ upon addition of the described chemical formulations. Based on core flood inhibition pilot tests described above (see FIG. 3), a suitable volume to completely inhibit FeS and analogous precursors ($Fe^{2+}$ and $H_2S/HS^-$) ranged from about 20 mL to about 30 mL of the blended inhibition solvent mixture with correlated $FeS_{(aq)}$, $Fe^{2+}$, and $H_2S/HS^-$ current intensities of 0.15 µAmps, 2.0 µAmps, and 0.0 µAmps, respectively. For large scale field application in situ in a wellbore proximate a hydrocarbon-bearing formation, periodic batch injections of about 3 barrels to about 5 barrels for every about 30 to about 45 days will maintain the $FeS_{(aq)}$, $Fe^{2+}$, and $H_2S/HS^-$ current intensities leading to efficient prevention of FeS scale formation at reservoir conditions.

Overall reactions governing the FeS scale inhibition can generally be represented via Equations 4 through 6. Equations 4 and 5 show elimination of reactive sulfide species, which inhibits $FeS_{(aq)}$ formation, and Equation 6 shows reduction in the amounts of reactive iron(II), via transition to $Fe^{2+}$ in $FeCl_3$.

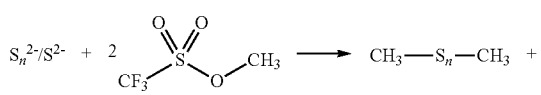

Eq. 4

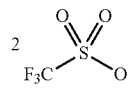

$H_2S/HS^-_{(g,aq)} + Zn^{2+} \longrightarrow ZnS + 2H^+/H^.$

Eq. 5

$Fe^{2+} + 3Cl^- \longrightarrow FeCl_3$

Eq. 6

Figure 6:
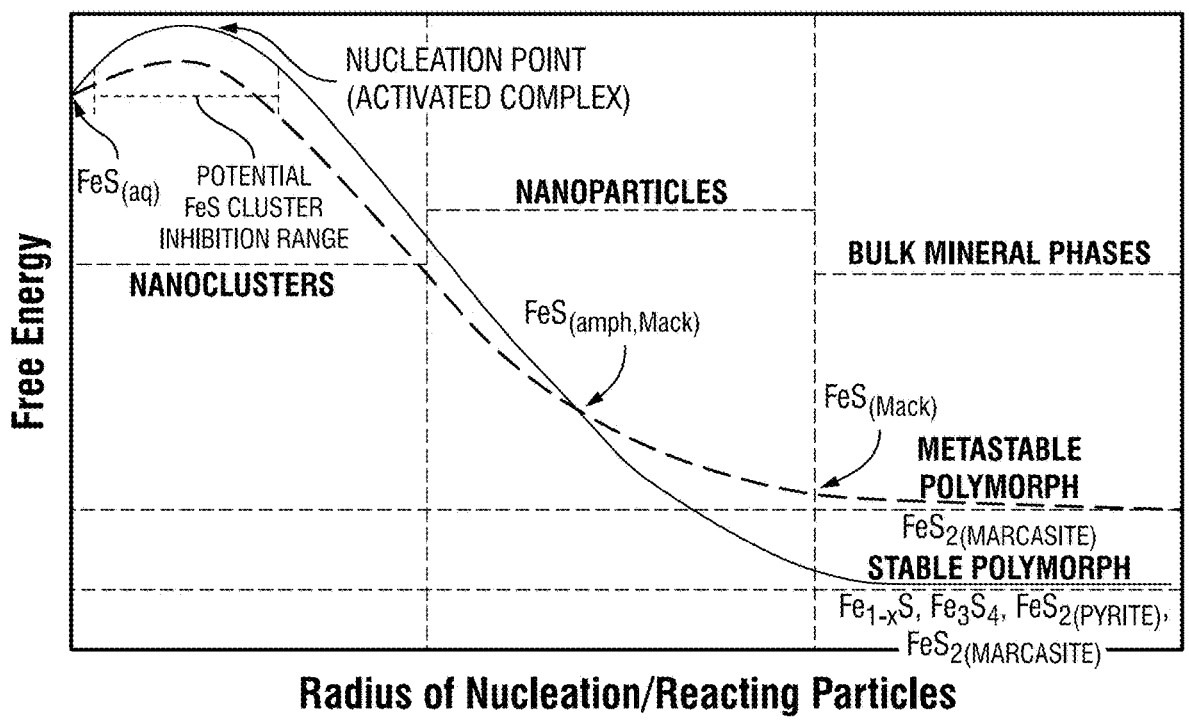
FIG. 6 is a graphic representation of a reaction profile for the inhibition and potential nucleation of nano-particulate iron sulfide molecular clusters, $FeS_{(aq)}$, where after nucleation, aggregation of bulk stable and metastable FeS minerals and scaling in HPHT petroleum reservoir conditions can occur.

Injection of the chemical solvent formulation including $CF_3SO_3CH_3$, $Zn(CH_3CO_2)_2$, and $CuCl_2$ not only prevented the crystal growth of molecular $FeS_{(aq)}$ clusters, but also removed the sulfide species and reduced the concentration of iron (II). This shows the capability of preventing FeS scale formation, for example at HPHT reservoir conditions. In addition to FeS products, typified transition metal sulfides such as PbS, ZnS, and HgS that usually occur as scale/deposition products in many hydrocarbon producing environments can be prevented or inhibited using methyl trifluoromethanesulfonate and copper chloride with zinc acetate. Treatment compositions and methods of the present disclosure can inhibit and remove both metastable polymorphs and stable polymorphs of scale, for example as shown in FIG. 6.

Coreflood Scale Inhibition Experiments In The Laboratory. Core flood injectivity tests were carried out on low-permeability, sulfur-bearing carbonate core samples to observe the growth, aggregation, and inhibition behavior of iron sulfide precursors. The core sample used in the present example exhibited the following properties: permeability, K=0.437 mD, porosity, 1=0.123, length, L=3.75 cm, and pore volume, V=5.4 mL. For each run under downhole conditions, the coreflood system was continuously flushed with $UHP-N_2$ during the course of the experiments. The study was carried out in a linear mode at a temperature value of 310° F., a back-pressure of 1,000 psi, and an overburden pressure of 2,000 psi.

The equivalent hydrogen sulfide ($H_2S$) and sulfide intermediates ($HS^-/S^{2-}/S_n^-$) required to form iron sulfide molecular clusters were obtained by injecting 0.5 M solutions of hydrochloric acid to release acid-volatile sulfides from the sulfur bearing carbonate core samples. This was followed by addition of 10 µM iron (II) solution to the core flood system. Cyclic voltammetric scans immediately taken from the coreflood experiments showed the formation and build-up of the aqueous $FeS_{(aq)}$ molecular clusters, $Fe^{2+}$, and small amount of $Fe^{2+}$ at reservoir conditions (as shown in FIG. 3).

Electroactive redox species responsible for the build-up $FeS_{(aq)}$ molecular cluster formation were monitored in real-time to assess the range of concentrations before and after the formation of the molecular clusters in the coreflood systems. The approximate concentration ranges for electroactive species in the sulfur-bearing carbonate core samples are presented in Table 1. Reactive "free" sulfide and the intermediate species ($H_2S/HS^-$) were not detected after the formation of the $FeS_{(aq)}$ molecular clusters (see FIGS. 1 and 2 versus FIG. 3). The lack of free sulfides in this experiment (FIG. 3) is likely due in part to the instantaneous incorporation of the vast majority of dissolved sulfide into the $FeS_{(aq)}$ molecular clusters. This observation shows that molecular $FeS_{(aq)}$ clusters play a critical role as precursors in FeS scaling and mineralization at HPHT reservoir conditions, for example in carbonate reservoirs.

TABLE 1

Approximate concentration ranges for forming $FeS_{(aq)}$ molecular clusters under HPHT conditions for carbonate core samples.

| REDOX SPECIES | APPROXIMATE RANGE OF DETECTION |
|---|---|
| $Fe^{2+}$ | 5-10 µM |
| $Fe^{3+}$(inorganic/organic) | molecular |
| $FeS_{(aq)}$ | molecular |

TABLE 1-continued

Approximate concentration ranges for forming $FeS_{(aq)}$ molecular clusters under HPHT conditions for carbonate core samples.

| REDOX SPECIES | APPROXIMATE RANGE OF DETECTION |
| --- | --- |
| $H_2S/HS^-$ | 10-17 nM |
| $S_x^{n-}$ | 1-5 nM |
| $S_8$ | n/a |

Inhibition tests performed directly in the experimental HPHT coreflood system using the previously-described inhibition solvent also showed a similar inhibition performance against the $FeS_{(aq)}$ molecular clusters' crystal growth and a progressive reduction in iron (II) concentrations (FIG. 3). A final yellowish-brown solution produced after inhibition can be pumped from the reservoir or flowlines and discarded as waste.

Figure 4:
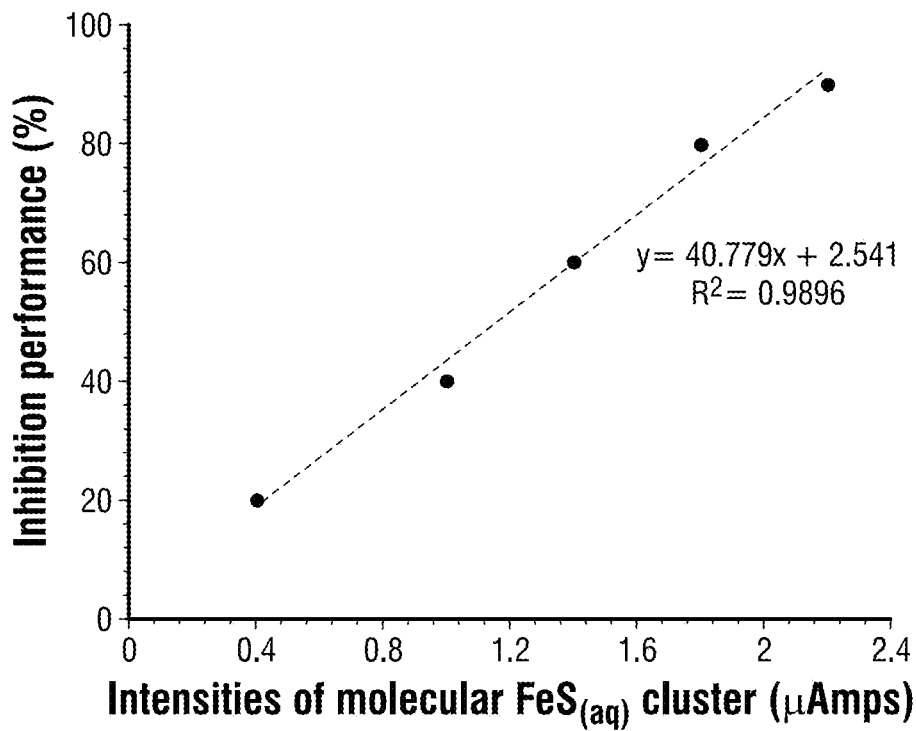
FIG. 4 is a graph showing the inhibition performance (approximately 90%) of formulations against molecular $FeS_{(aq)}$ cluster formation under coreflood experimental conditions.
Figure 5:
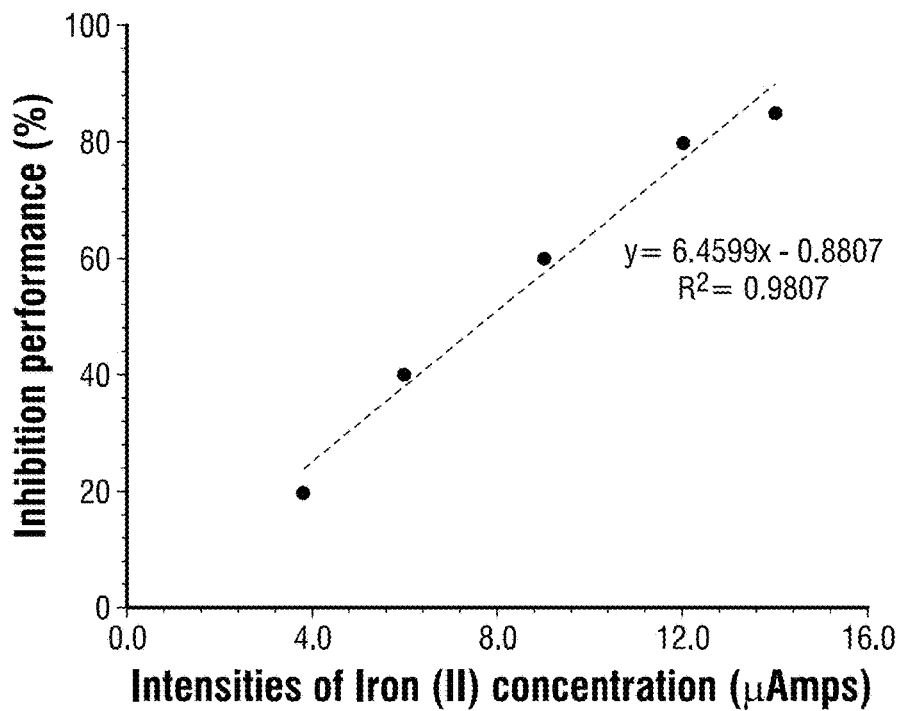
FIG. 5 is a graph showing a concentration drop (approximately 81%) in iron (II) species and showing the R2-values that were affected by a scale inhibition solvent formulation under core flood experimental conditions.

The result of the inhibition performance versus intensities of $FeS_{(aq)}$ molecular cluster crystal decay is illustrated in FIG. 4, for example inhibition performance up to 90%. Also shown (in FIG. 5) is an up to 81% reduction in iron (II) concentration that was effected by the inhibition chemical formulation in the coreflood experiments.

FIG. 6 is a graphic representation of a reaction profile for the inhibition and potential nucleation of nano-particulate iron sulfide molecular clusters, $FeS_{(aq)}$, where after nucleation, aggregation of bulk stable and metastable FeS minerals and scaling in HPHT petroleum reservoir conditions can occur. FIG. 6 shows iron sulfide phase reactions and crystal growth through $FeS_{(aq)}$ molecular clusters in petroleum reservoirs can be effectively prevented or controlled at the cluster phase without directly impacting the reservoir flow assurance and permeability of the rock formation.

The singular forms "a," "an," and "the" include plural referents, unless the context clearly dictates otherwise. The term "about" when used with respect to a value or range refers to values including plus and minus 5% of the given value or range.

In the drawing and specification, there have been disclosed example embodiments of the present disclosure, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for prevention and reduction of iron sulfide scale formation, the method comprising the steps of:
    detecting at least one component indicative of an iron sulfide scale precursor, the at least one component selected from the group consisting of: $H_2S$; $HS^-$; $S^{2-}$; $S_n\hat{}(2-)$; $FeS_{(aq)}$; $Fe^{2+}$; $Fe^{3+}$; and combinations of the same, wherein the step of detecting comprises the use of a solid state glass Au-amalgam electrode comprising activated carbon particles;
    preparing a composition to react with the iron sulfide scale precursor, the composition comprising at least one compound selected from the group consisting of: a methylating agent; a metal operable to react with sulfide species; a compound to increase the oxidation state of $Fe^{2+}$; and combinations of the same; and
    applying the composition to the iron sulfide scale precursor to consume the iron sulfide scale precursor.

2. The method according to claim 1, wherein the Au-amalgam electrode comprises a gold wire about 100 μm in diameter.

3. The method according to claim 2, further comprising the use of a Pt counter electrode, and a Ag/AgCl reference electrode with the Au-amalgam electrode.

4. The method according to claim 1, wherein the composition comprises the methylating agent, the metal operable to react with sulfide species; and the compound to increase the oxidation state of $Fe^{2+}$.

5. The method according to claim 4, wherein the methylating agent comprises methyl trifluoromethanesulfonate, the metal comprises zinc, and the compound to increase the oxidation state of $Fe^{2+}$ comprises chlorine.

6. The method according to claim 1, wherein the step of preparing comprises mixing methyl trifluoromethanesulfonate with copper chloride and zinc acetate.

7. The method according to claim 6, wherein the molar ratio of methyl trifluoromethanesulfonate to zinc acetate is about 1:1 and the molar ratio of methyl trifluoromethanesulfonate to copper chloride is about 10:1.

8. The method according to claim 6, wherein the step of mixing includes the use of an organic solvent.

9. The method according to claim 8, wherein the organic solvent comprises ethanol.

10. The method according to claim 1, wherein before the step of applying the composition is cooled to below room temperature.

11. The method according to claim 1, further comprising the step of applying voltammetry to verify a decrease of concentration in at least one component selected from the group consisting of: $H_2S$; $HS^-$; $S^{2-}$; $S_n\hat{}(2-)$; $FeS_{(aq)}$; $Fe^{2+}$; and combinations of the same, or to verify an increase in concentration of $Fe^{3+}$.

12. The method according to claim 1, further comprising the step of applying the composition to reduce the formation of a compound selected from the group consisting of: PbS, ZnS, HgS, and combinations of the same.

13. The method according to claim 1, where the step of applying the composition to the iron sulfide scale precursor to consume the iron sulfide scale precursor comprises applying the composition in a batch of about 3 barrels to about 5 barrels to a wellbore proximate a hydrocarbon-bearing formation every about 30 to about 45 days.

* * * * *